April 8, 1924. 1,489,343
J. W. BRUNDAGE
SHOCK ABSORBER
Filed March 13, 1922    4 Sheets-Sheet 1
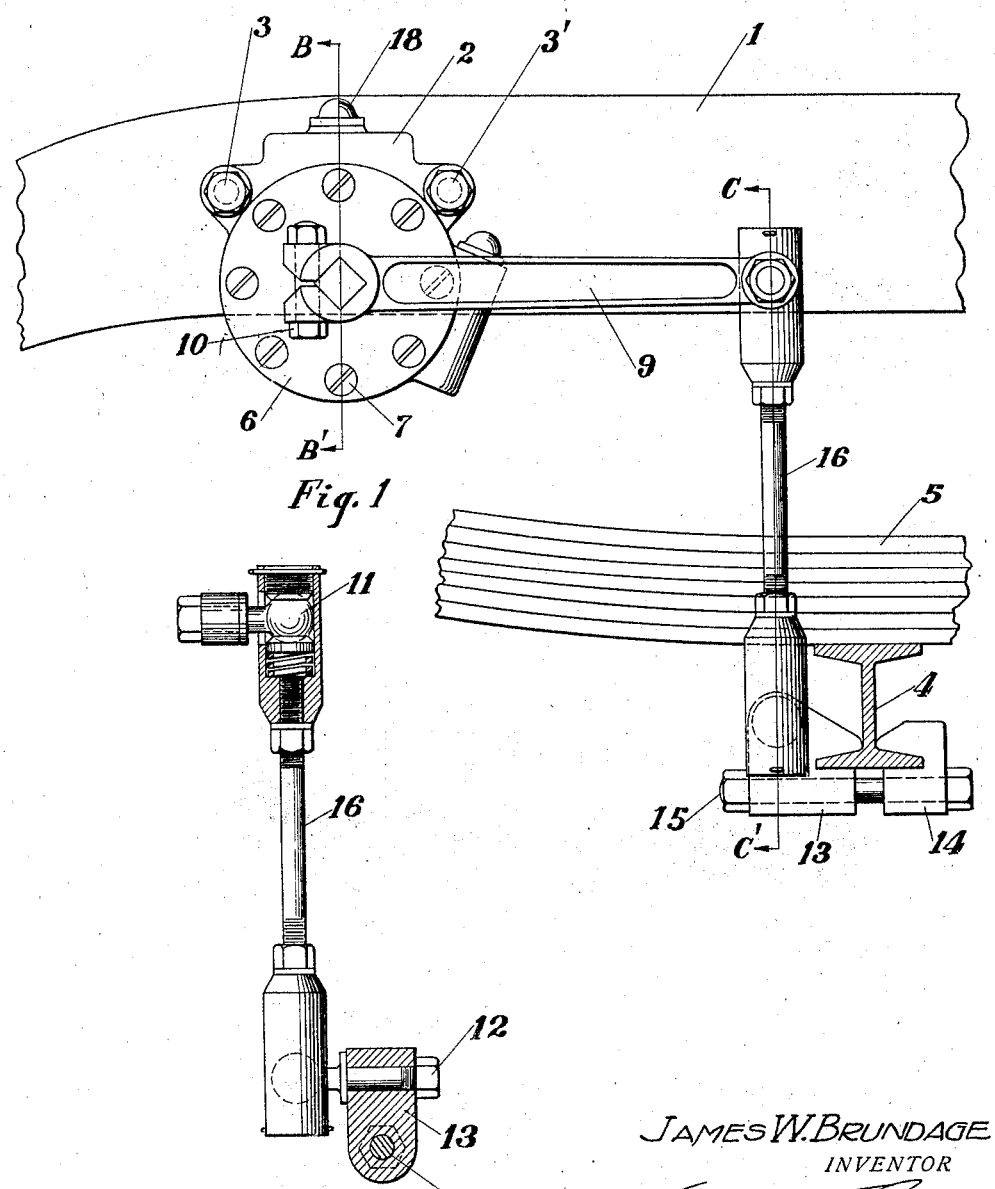
JAMES W. BRUNDAGE
INVENTOR
BY
ATTORNEY

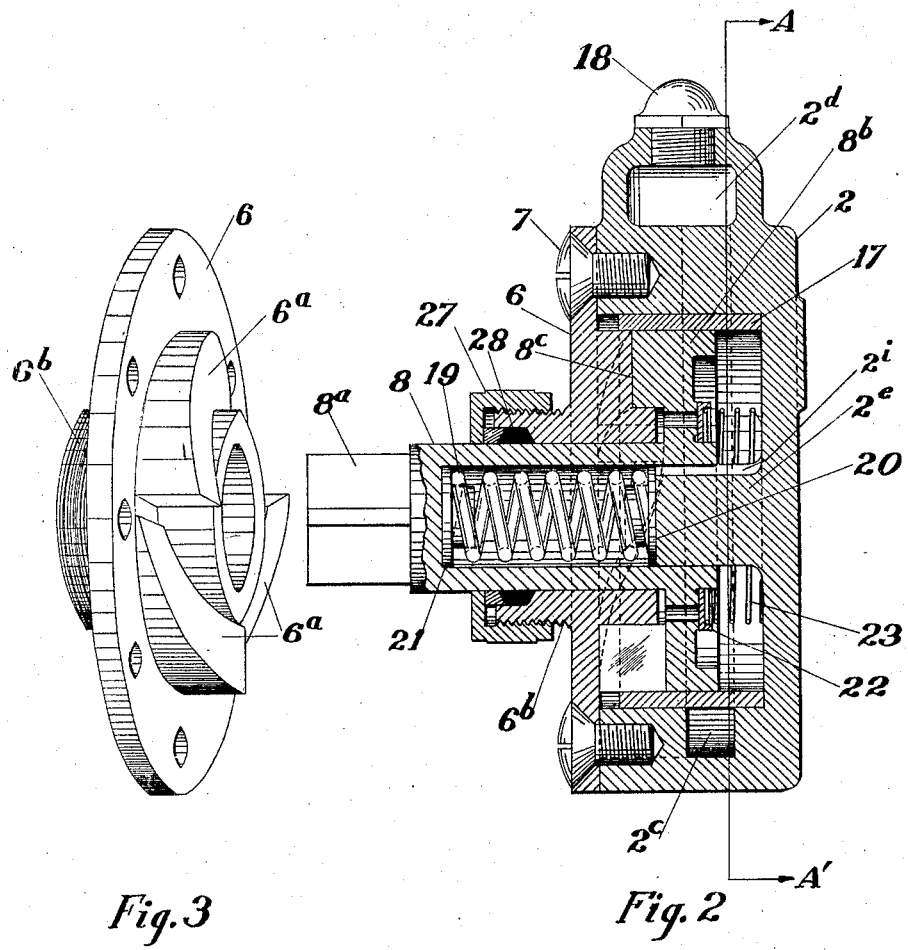

April 8, 1924.

J. W. BRUNDAGE

SHOCK ABSORBER

Filed March 13, 1922

1,489,343

4 Sheets-Sheet 3

JAMES W. BRUNDAGE.
INVENTOR

BY

ATTORNEY

April 8, 1924.

J. W. BRUNDAGE

SHOCK ABSORBER

Filed March 13, 1922     4 Sheets-Sheet 4

1,489,343

JAMES W. BRUNDAGE.
INVENTOR

BY
ATTORNEY

Patented Apr. 8, 1924.

1,489,343

UNITED STATES PATENT OFFICE.

JAMES W. BRUNDAGE, OF AKRON, OHIO.

SHOCK ABSORBER.

Application filed March 13, 1922. Serial No. 543,364.

*To all whom it may concern:*

Be it known that I, JAMES W. BRUNDAGE, a citizen of the United States, and a resident of Akron, in the county of Summit and State of Ohio, have invented certain new and useful Improvements in Shock Absorbers, of which the following is a specification.

My present invention relates to new and useful improvements in shock absorbers, and more particularly, to that class of devices in which the control of a substantially non-compressible fluid when confined by pressure caused by the flexing of a vehicle spring is depended upon to control the velocity of the flexing movement.

The object of my invention is to produce a device of the class specified which will offer substantially no resistance to the movement of the vehicle spring during the compression of the spring, but which will offer a substantial amount of resistance, tending to decrease the velocity of recovery of the spring from compression.

A further object of my invention is to produce a shock absorber in which the fluid when under compression is maintained at a constant pressure.

A further object of my invention is to produce a device in which the liquid is caused to circulate in such a way as to cool the liquid.

A further object of my invention is to produce a device in which the length of the fluid containing cylinder may be constructed within reasonable limits without diminishing the fluid capacity of the device.

Further objects are to produce a device consisting of few parts which may be easily machined and replaced in case of breakage or wear.

Other objects of the invention will be more fully described and illustrated in the accompanying description and drawings and specifically pointed out in the claims.

Figure 4:
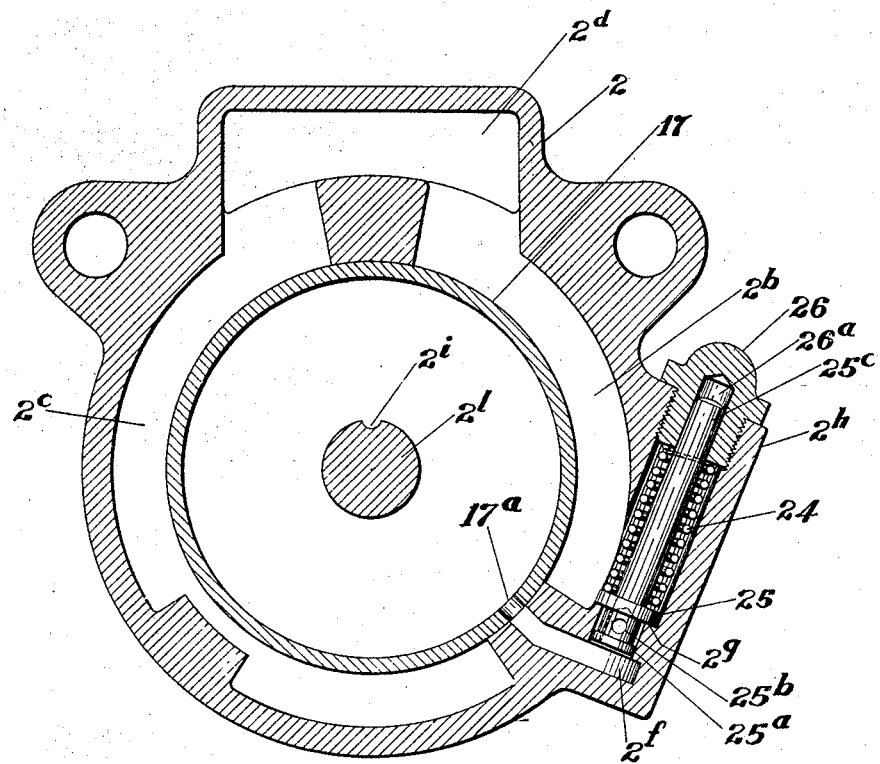
Figure 6:
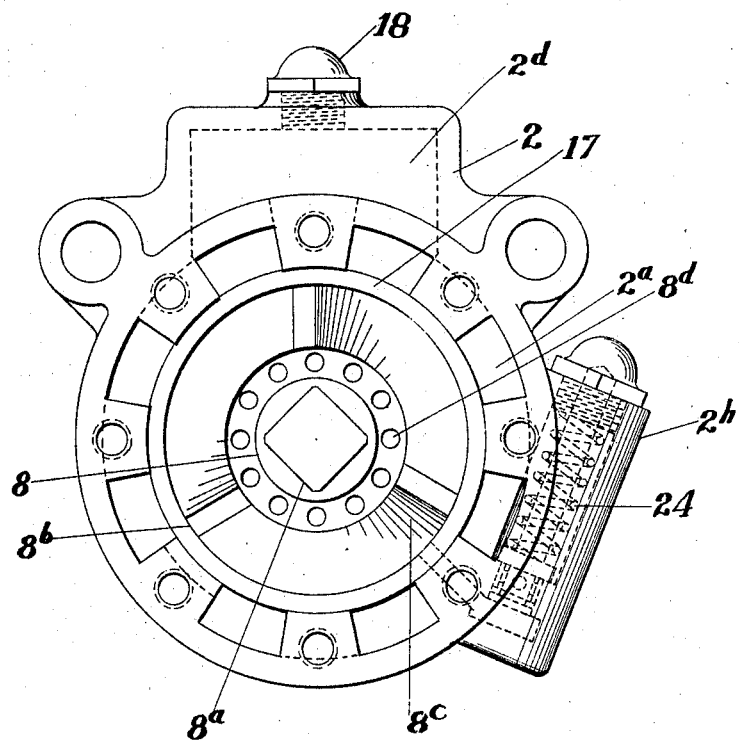

A preferred embodiment of my invention is illustrated in the accompanying drawings in which Figure 1 is a side elevation of the device illustrating its attachment to the frame and axle of a vehicle. Figure 2 is a vertical cross section on line B—B'. Figure 3 is a perspective view of the cover. Figure 4 is a vertical cross section on line A—A' of Figure 2. Figure 5 is an elevation partly in section on line C—C' of Figure 1 and Figure 6 is an elevation of the device with the lever and cover removed.

Referring more specifically to the drawings in which similar reference numerals designate corresponding parts, 1 designates a portion of the frame member of the vehicle to which the casing 2 of the shock absorber is rigidly fastened, as for example, by bolts 3, 3'. The axle of the vehicle shown in section is indicated by the numeral 4 and the spring of the vehicle which is of the ordinary semi-elliptical type and which is rigidly fastened at its center to the axle 4 and has its extremities linked to the frame member 1 in the manner well known in the art, is conventionally shown and indicated by the numeral 5. Casing 2 is provided with a cover 6 which is fastened thereto as by screws 7. Cover 6 is formed with a central bearing through which is rotatably journaled a shaft 8 provided with a squared extremity $8^a$. A lever 9 is provided with a square opening corresponding to the squared end $8^a$ of the shaft and a clamp bolt 10 by means of which it may be clamped thereto. Lever 9 is provided at the opposite extremity with a stud 11 provided with a spherical shaped end and a similar stud 12 is rigidly fastened to the axle 4 of the vehicle as for example, by the clamping blocks 13 and 14 and bolt 15. Lever 9 is connected to axle 4 by means of a preferably adjustable connecting rod 16, engaging the studs 11 and 12 whereby movement of the axle 4 relative to the frame 1 will cause a rotation of shaft 8 and at the same time shaft 8 may be moved axially for the purpose hereinafter described.

Casing 2 is machined internally to receive a cylindrical sleeve 17 which is pressed therein and which is slightly shorter than the internal depth of the casing. Casing 2 is also provided with a number of radial pockets $2^a$ which extend from the open end of the casing to annular grooves $2^b$ and $2^c$. A fluid storage cavity $2^d$ is also formed in the casing and connects to grooves $2^b$ and $2^c$. Storage cavity $2^d$ is provided with a threaded filling opening adopted to be closed by a plug 18.

Shaft 8 is formed with a cylindrical cavity at its innermost extremity which slidably embraces a pin-bearing $2^e$ integral with the rear wall of casing 2 and a compression coil spring 19 located in this cavity between anti-friction discs 20 and 21 exerts a force tending to force shaft 8 to the left in Figure 2. A piston $8^b$ accurately fitted in sleeve 17 is rigidly mounted on shaft 8 and preferably made integral therewith.

Cover 6 is provided with a plurality of inclined cam surfaces 6ª and piston 8ᵇ is provided with corresponding cam surfaces 8ᶜ for co-operation therewith. It will be obvious that when shaft 8 is partially rotated, these co-acting surfaces being held in contact by spring 19 will cause the piston 8ᵇ to reciprocate in the cylinder sleeve 17.

Piston 8ᵇ is provided with a series of perforations 8ᵈ, annularly arranged and forming ports through which the fluid contained in the cylinder formed by the sleeve 17 and casing 2 might pass through the piston when displaced thereby. A ring-shaped valve 22 is maintained in contact with the perforations on one side of the piston by a coil spring 23 impinging against the rear wall of casing 2 and prevents flow of the fluid through the piston when the piston is moving to the right in Figure 2, but allows the flow of oil through the ports 8ᵈ when the piston is moved in the opposite direction.

A hole 17ª in sleeve 17 constitutes the only means of egress for the liquid confined to the right of the piston in Figure 2. The hole 17ª connects with a passage 2ᶠ below a valve seat 2ᵍ formed in the casing 2. A compression coil spring 24 mounted in a cavity formed in lug 2ʰ of casing 2 serves to hold a valve 25 normally in contact with valve seat 2ᵍ. Valve 25 is provided with a hollow pilot 25ª having a plurality of ports 25ᵇ drilled therethrough. A valve stem 25ᶜ extends into a guide hole 26ª in a threaded closure plug 26, fitted to lug 2ʰ, the bottom of said guide hole limiting the distance which valve 25 may be raised. The interior of lug 2ʰ is in communication with annular groove 2ᵇ so that any fluid passing through hole 17ª and passage 2ᶠ, if under sufficient pressure may raise valve 25 and pass through annular groove 2ᵇ and radial pockets 2ª to the space between the cover 6 and piston 8ᵇ.

Cover 6 is provided with a stuffing box 6ᵇ and cover 27 for holding a packing 28 around shaft 8, whereby leakage of fluid is prevented.

Pin-bearing 2ᵉ is provided with a groove 2ⁱ cut therein to allow the fluid to pass readily in and out of the chamber in which spring 19 is confined. This groove is preferably placed in the top of the bearing to allow the entrapped air to escape when filling the device.

Before operating my device, the plug 18 is removed and the casing filled with a substantially non-compressible fluid, preferably oil, and thereafter the fluid is maintained at such a level as to partially fill chamber 2ᵈ. The lever 9 is designed so that the maximum movement of the vehicle springs will rotate shaft 8 through an angle less than the angular extent of one of the cam faces 6ª and these cam faces are inclined in such a direction that an upward movement of lever 9 as shown in Figure 1 will cause the piston to move toward the cover 6, it being understood that right hand and left hand devices would ordinarily be used on opposite sides of the vehicle.

The spring 24 being designed to regulate the resistance to flow of the liquid around the piston is so located as to be easily removed and replaced by one of different strength without disturbing other mechanism and different springs may be provided for vehicles of different weights.

By constructing the casing with the radial pockets 2ª and annular grooves 2ᵇ, I secure a construction in which a large volume of fluid may be used in a comparatively short cylinder and by circulating the fluid in one direction through these passages in contact with a large area of metallic surface any rise of temperature due to absorbed energy with consequent lowering of viscosity of the fluid and stagnation of the fluid are avoided.

The device being mounted on the vehicle as heretofore explained and illustrated in Figure 1, and having been filled with a substantially non-compressible fluid, the operation of the device is as follows:

When the vehicle is standing still the piston 8ᵇ will be located in an intermediate position in respect to the cylinder, referring to Figure 2, and part of the fluid will be contained in the left end of the cylinder and the various passages in casing 2. Assuming that the vehicle after being placed in motion meets some irregularity in the road bed, such as a sudden projection, the vehicle springs will be suddenly flexed by an upward movement of the axles. This movement of the springs will cause the lever 9 to be raised (as seen in Figure 1) thereby moving the piston 8ᵇ toward the stuffing box end of the cylinder. During this movement of the piston the valve 22 which is normally held in contact with openings 8ᵈ by spring 23 will be automatically opened. Spring 23 is so designed as to exert only enough pressure to insure closing of valve 22 when required and as the openings 8ᵈ provide a great area of escape, the device offers little resistance to the upward deflection of the vehicle springs.

As the vehicle springs attempt to recover their normal position, valve 22 closes and the fluid to the right of the piston is placed under compression. As valve 25 now constitutes the only means of egress for the entrapped fluid and as this valve is normally held closed by a strong spring 24 of predetermined strength, the liquid cannot escape without lifting valve 25 against this resistance so that a constant pressure resistance is offered to recovery of the vehicle spring. As the entrapped fluid reaches a pressure sufficient to balance spring 24, it lifts valve 25 and passes through the cooling cavities to the left of piston 8$^b$ where it is ready for reuse.

Having described my invention what I claim is:

1. In a device of the class specified, a liquid containing cylinder, a one piece piston and shaft co-operating therewith, means for oscillating said piston and shaft, cam means for guiding said piston axially when rotated in one direction, and resilient means co-operating with said cam means for guiding said piston in the opposite direction.

2. In a device of the class specified, a casing having an uninterrupted cylindrical bore, a cover therefor provided with a central stuffing box, a power-actuated shaft passing through said stuffing box, a piston fitted in said cylinder and fixed to said shaft, co-operating helical cam means mounted on said piston and cover, and spring means within said cylinder acting to keep the cam surfaces in contact.

3. In a device of the class specified, a casing provided with radial fluid cooling and storing pockets, a cylindrical sleeve pressed therein and partially isolating said pockets, a cover closing said casing provided with a stuffing box and a helical cam surface, a power oscillated shaft passing through said stuffing box, a piston fitted in said sleeve and mounted on said shaft, a cam surface on said piston co-operating with the cam surface on said cover and means for conveying the displaced fluid through said cooling pockets.

4. In a device of the class specified, means for confining a liquid, means for exerting pressure on said liquid, by-pass means for relieving said pressure, and a liquid cooling chamber surrounding said confining means.

5. In a device of the class specified means for confining a liquid, means operated by the distortion of the vehicle springs under compression to charge said confining means without appreciable resistance, means to allow escape of the confined liquid when acted upon by the recoil of the vehicle springs, means for controlling the pressure of the escaping liquid, means for cooling said liquid and means for returning said liquid for reuse.

6. In a device of the class specified, a cylinder for confining a liquid, a piston fitted therein provided with a cam surface, a cover for said cylinder provided with a co-acting cam surface, and a central stuffing box, a shaft connected to said piston and protruding through said stuffing box, means connecting said shaft to the springs of a vehicle whereby reciprocating movement is imparted to said piston, means for regulating the displacement of the liquid, and means for maintaining contact of the cam surfaces.

7. In a device of the class specified, a cylinder casing, a cylinder lining pressed therein and slightly shorter than said casing, a piston mounted for reciprocating movement in said cylinder lining, means for actuating said piston, and storage pockets formed between the casing and lining whereby an excess of liquid may be stored without materially lengthening the cylinder.

In testimony whereof, I affix my signature.

JAMES W. BRUNDAGE.